United States Patent
East et al.

(10) Patent No.: US 8,538,004 B2
(45) Date of Patent: Sep. 17, 2013

(54) METHOD AND APPARATUS FOR RELAYING CALLS

(75) Inventors: Allen Michael East, Cary, NC (US); Gregory A. Dunko, Cary, NC (US); Leland Scott Bloebaum, Cary, NC (US)

(73) Assignee: Sony Corporation Sony Mobile Communications AB, Lund (SE)

( * ) Notice: Subject to any disclaimer, the term of this patent is extended or adjusted under 35 U.S.C. 154(b) by 1158 days.

(21) Appl. No.: 12/350,574

(22) Filed: Jan. 8, 2009

(65) Prior Publication Data

US 2010/0166170 A1     Jul. 1, 2010

Related U.S. Application Data

(60) Provisional application No. 61/141,348, filed on Dec. 30, 2008.

(51) Int. Cl.
*H04M 7/00*     (2006.01)

(52) U.S. Cl.
USPC .......... 379/221.01; 379/221.02; 379/272; 379/273; 379/413.03; 37/351; 37/355; 37/356; 37/395.31

(58) Field of Classification Search
USPC ......... 379/211.02; 455/435.2, 445; 370/352, 370/356
See application file for complete search history.

(56) References Cited

U.S. PATENT DOCUMENTS

| | | | |
|---|---|---|---|
| 6,876,855 B1 * | 4/2005 | Howe | 455/445 |
| 6,907,031 B1 * | 6/2005 | Ehlinger et al. | 370/352 |
| 7,333,806 B2 | 2/2008 | Kingsolver et al. | |
| 2003/0220074 A1 | 11/2003 | Wee et al. | |
| 2005/0063416 A1 | 3/2005 | Shin et al. | |
| 2005/0096024 A1 | 5/2005 | Bicker et al. | |
| 2007/0099613 A1 * | 5/2007 | Burgan et al. | 455/435.2 |
| 2007/0206580 A1 | 9/2007 | Silver et al. | |
| 2007/0263819 A1 | 11/2007 | Finkelman et al. | |
| 2007/0268858 A1 | 11/2007 | Soto | |
| 2008/0102817 A1 | 5/2008 | Shenassa et al. | |
| 2008/0186959 A1 * | 8/2008 | Chen et al. | 370/356 |
| 2008/0305786 A1 | 12/2008 | Arumi et al. | |
| 2010/0080376 A1 * | 4/2010 | Hartley et al. | 379/211.02 |
| 2010/0157995 A1 * | 6/2010 | Bigalke et al. | 370/356 |

FOREIGN PATENT DOCUMENTS

| | | |
|---|---|---|
| CN | 101198089 A | 6/2008 |
| JP | 07162935 A | 6/1995 |
| JP | 09023279 A | 1/1997 |
| JP | 2001352288 A | 12/2001 |
| JP | 2005033808 A | 2/2005 |
| WO | 0176154 A2 | 10/2001 |
| WO | 2004066605 A1 | 8/2004 |

OTHER PUBLICATIONS

JP Notice of Allowance mailed Feb. 11, 2012 in re JP Application No. 2011543508 filed Jun. 17, 2011.
CN Search Report issued Jun. 28, 2013 in re CN Application No. 200980152942.9 filed Jun. 28, 2011.

* cited by examiner

*Primary Examiner* — Joseph J Nguyen
(74) *Attorney, Agent, or Firm* — Coats & Bennett, P.L.L.C.

(57) ABSTRACT

A dual mode user terminal for a calling party can make calls over both a conventional cellular network and a packet data network using VoIP protocols. If the called party is not available to receive a VoIP call over the packet data network, the user terminal for the calling party can request a third party user terminal available on the packet data network to relay the call between the calling party and the called party.

16 Claims, 4 Drawing Sheets

METHOD AND APPARATUS FOR RELAYING CALLS

RELATED APPLICATION

This application claims the benefit of U.S. Provisional Patent Application 61/141348 filed Dec. 30, 2008, which is incorporated herein by reference.

BACKGROUND

The present invention relates generally to a method and apparatus for making calls and, more particularly, to a method and apparatus of using a third party cellular phone to relay calls so as to avoid long distance cellular phone charges.

The popularity of cell phones has increased dramatically in recent years. This increase is due, in part, to the availability of "free" cellular phones packaged with low cost service plans. Some plans, for example, allow users to make unlimited calls within a local area. Also, plans are available that allow users to make unlimited calls to designated family members and friends. However, long distance calls, international calls, and other calls outside the plan may be prohibitively expensive.

Many new cell phones now provide data services, as well as voice services. Users can now use their cell phones to browse the Internet, send and receive emails, and converse with friends using Instant Messaging. While cell phones allow Internet access for data services, the data rates over cellular networks do not compare favorably to data rates that can be obtained over conventional land lines.

Many cell phones now include integrated WiFi and allow users to connect to the Internet over wireless local area networks (WLANS). With a wireless LAN connection, the user of a cell phone can avoid long distance or international tariffs using a voice-over IP (VoIP) application installed on the cellular phone. Voice-over IP is a technology that allows voice to be digitized and transmitted over the Internet. Using VoIP, the cellular phone could use VoIP whenever a wireless LAN is available to make long distance and/or international calls and thereby avoid the high cost normally imposed for such calls by most cellular phone plans. However, if the called party is not available using the VoIP application, either because the called party does not have an Internet connection or is currently off-line, the user may nevertheless be required to make some long distance and/or international calls over cellular networks.

SUMMARY

The present invention provides a method and apparatus for establishing a call between a calling party and a called party that is remotely located from the calling party. A calling party user terminal comprises, for example, a cellular telephone having integrated wireless LAN capability. The user terminal can place calls in a conventional manner over a wireless communication network. The user terminal also includes an application for making Internet phone calls using VoIP protocol. The communication application is configured so that when the user places a call that would be prohibitively expensive under the user's service plan with the cellular provider, the communication application attempts to make an Internet call to avoid the high cost. More particularly, the communication application on the calling party user terminal determines whether the called party is available on the Internet. If so, the call is made to the called party over the Internet using voice-over IP protocols. If the called party is not available on the Internet, the communication application determines if there is a third party available on the Internet willing to relay calls to the called party. If a third party willing to relay calls is available on the Internet, the communication application establishes a call with the third party and provides the third party with the called party address. The third party user terminal then establishes a second connection with the called party over an alternate network, such as a mobile communication network, and relays signals between the called party and calling party. Thus, the third party user terminal functions as a calling proxy for the calling party.

Exemplary embodiments of the present invention comprise a method implemented by a user terminal for a calling party of placing a call from the calling party to a called party remotely located from the calling part. In one embodiment, the method comprises determining the availability of a called party user terminal on a packet data communication network; establishing a call with the called party user terminal over the packet data network if the called party user terminal is available on the packet data network; and if the called party user terminal is not available on the packet data network, identifying a third party user terminal available on the packet data network to relay the call and requesting the third party user terminal to relay said call from the calling party user terminal to the called party user terminal over an alternate communication network.

In some embodiments, identifying a third party user terminal available to relay the call comprises identifying a third party terminal available on the packet data network to relay the call.

In some embodiments, identifying a third party user terminal available on the packet data network comprises accessing a group list for a predefined group, and identifying one or more third party user terminals on said group list that are currently available on said packet data network.

In some embodiments, determining the availability of the called party user terminal on a packet data communication network comprises periodically receiving presence information from a presence server indicating the availability status of said called party user terminal.

In some embodiments, said group list is stored in said calling party user equipment.

In some embodiments, said group list is stored in a server accessible via said packet data network.

In some embodiments, identifying a third party user terminal available to relay the call comprises identifying a third party terminal available on a personal area network to relay the call.

In some embodiments, requesting the third party user equipment to relay said call from said calling party to a user terminal of said called party comprises establishing communication with said third party user terminal; and providing a called party address to said third party user terminal for establishing communication between said third party user equipment and said called party user terminal over an alternate communication network.

Exemplary embodiments of the present invention further comprise a dual mode user terminal. One embodiment of the dual mode user terminal comprises a first communication interface for communicating over a mobile communication network; a second communication interface for communicating over a packet data network; a control processor configured to determine the availability of a called party user terminal on the packet data network; establish a call with the called party user terminal over the packet data network if the called party user terminal is available on the packet data network; and if the called party user terminal is not available on the packet data network, identify a third party user terminal available to relay the call and request the third party user terminal to relay said call from the calling party user terminal to the called party user terminal over the mobile communication network.

In some embodiments of the user terminal, the control processor is configured to identify a third party user terminal available on the packet data network to relay the call.

In some embodiments of the user terminal, the control processor is configured to identify a third party user terminal available on the packet data network by accessing a group list for a predefined group, and identifying one or more third party user terminals on said group list that are currently available on said packet data network.

In some embodiments of the user terminal, the control processor is configured to determine the availability of the called party user terminal on a packet data communication network by periodically receiving presence information from a presence server indicating the availability status of said called party user terminal.

In some embodiments of the user terminal, the group list is stored in said calling party user equipment.

In some embodiments of the user terminal, the group list is stored in a server accessible via said packet data network.

In some embodiments of the user terminal, the control processor is configured to identify a third party user terminal available on a personal area network to relay the call.

In some embodiments of the user terminal, the control processor is configured to request the third party user equipment to relay said call from said calling party to a user terminal of said called party by establishing communication with said third party user terminal; and providing a called party address to said third party user terminal for establishing communication between said third party user equipment and said called party user terminal over an alternate communication network.

DETAILED DESCRIPTION

The present invention will be described in the context of an exemplary communication network 10 shown in FIG. 1. The communication network 10 includes a mobile communication network 20, having one or more base stations 22 for communicating with user terminals 100. The mobile communication network 20 may be a conventional cellular network operating according to any communication standards now known or later developed. For example, the mobile communication network 20 may comprise a Wideband Code Division Multiple Access (WCDMA) network, a Long Term Evolution (LTE) network, or WiMAX network. The mobile communication network 20 interconnects with a packet data network 30. The packet data network 30 may comprise a public network such as the Internet, or a private network. The packet data network 30 comprises one or more wireless access points (WAPs) 32 for communicating with user terminals 100. The WAPs 32 may, for example, operate according to the 802.11 family of standards, which is commonly referred to as WiFi. The mobile communication network 20 and packet data network 30 may further interconnect with the public switched telephone network (PSTN) 40, which allows the user terminal 100 to communicate with conventional land-line telephones 42.

In the illustrated embodiment, it is presumed that the user terminals 100 are capable of communicating with both the mobile communication network 20 via base stations 22, and with the packet data network 30 via wireless access points 32. The user terminals 100 include a conventional cellular transceiver for communications with the mobile communication network 20. The user terminals 100 further include short-range radio interface, such as a WiFi interface or BLUETOOTH interface, for communicating with WAPs 32 connected on the packet data network 30. User terminals 100 may also communicate over ad-hoc personal area networks (PANs) using the BLUETOOTH interface. Each user terminal 100 is further configured with a communications application that enables the user terminal 100 to make and receive calls over both the mobile communication network 20 and packet data network 30. Communication of voice over packet data networks 30, such as the Internet, is well-known in the art and is commonly referred to as voice over IP (VoIP). As will be described in greater detail below, the communications application also allows the user terminals 100 to serve as relays to relay calls from a calling party user terminal 100 with access to the packet data network 30 to a called party user terminal 100 that is not currently available on the packet data network 30.

Figure 1:
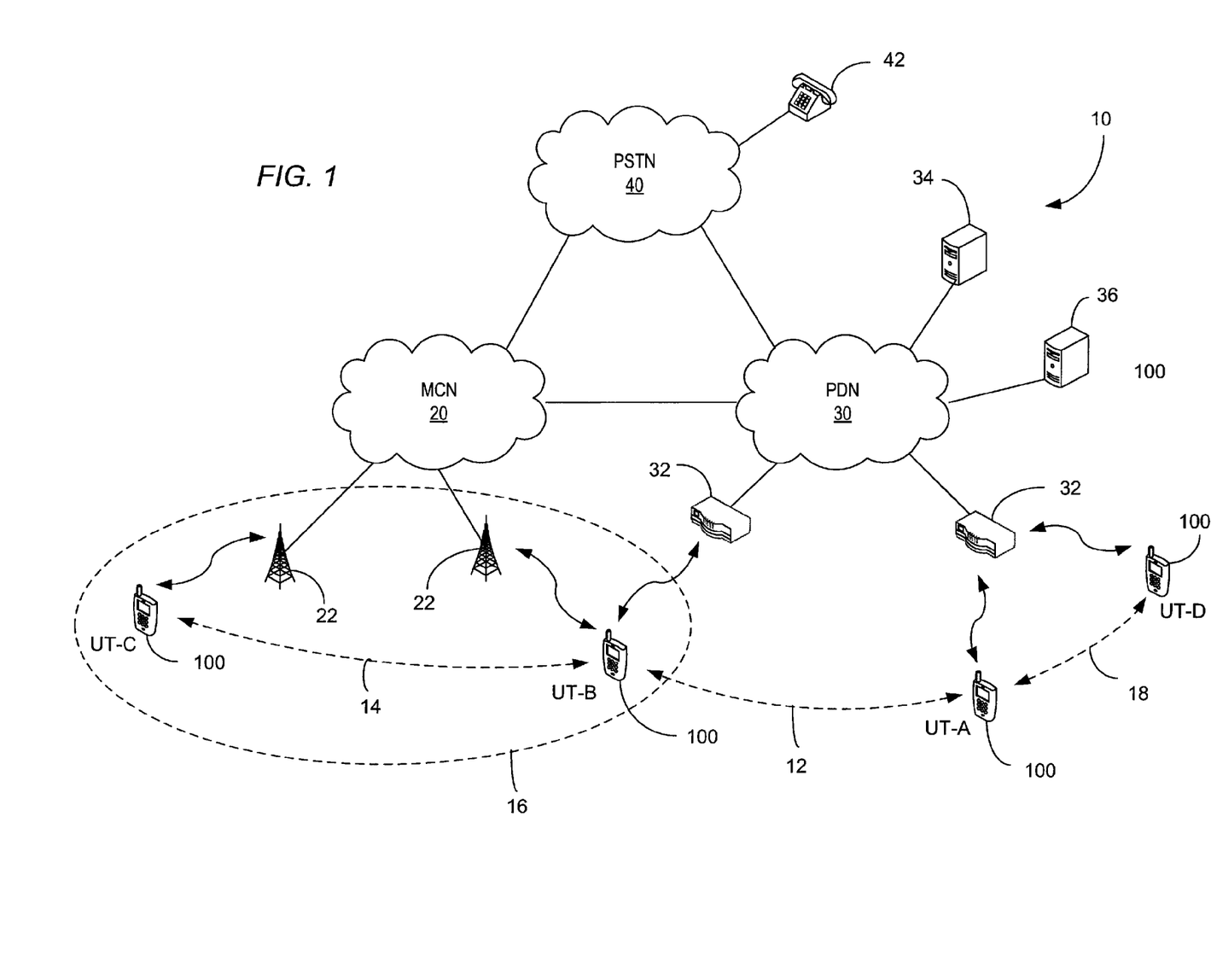
FIG. 1 illustrates an exemplary communication network.

FIG. 1 illustrates four user terminals (UT) denoted as UT-A, UT-B, UT-C, and UT-D respectively. UT-A and UT-B are shown as currently connected to the packet data network 30 via respective WAPs 32. It will be appreciated that UT-A and UT-B may be remotely located from one another. UT-B and UT-C are shown as being registered with the mobile communication network 20. Now assume that the user for UT-A wants to place a call to the user for UT-C, which would result in relatively high cost if made over a conventional mobile communication network 20. UT-A would prefer to place the call over the packet data network 30. However, UT-C is not currently accessible over the packet data network 20. However, UT-C is currently located in the local calling area 16 of UT-B. UT-B can make calls to UT-C at relatively low cost. For example, UT-B may have a plan that allows unlimited calling within the local area, which incurs no additional charge beyond the monthly fee. In this case, UT-B can act as a relay between UT-A and UT-C. UT-A establishes a connection 12 with UT-B over the packet data network 30 and requests UT-B to act as a relay. UT-B then establishes a second connection 14 with UT-C over the MCN 20. UT-A can thus avoid long distance charges of the cellular provider by connecting via the packet data network 30 to UT-B and requesting UT-B to relay the call to UT-C over the mobile communication network 20. In this case, UT-A may incur a small connection charge to connect to the packet data network 30. Also, UT-B may charge a small fee to serve as a relay for UT-A.

While UT-C is shown as a user terminal 100 on the MCN 20, it will be appreciated that the same solution can be used to connect to a conventional telephone 42 on the PSTN 40. In this case, the MCN 20 could route the call to the PSTN 40 in a known manner to establish a connection between UT-B and UT-C. Also, those skilled in the art will appreciate that the connection between UT-B and UT-C could be made using a BLUETOOTH interface.

As an aid in further understanding the invention, an exemplary use case will be described. For this example, assume that the users for UT-A, UT-B, and UT-C are employees of Company A. Company A provides each of its employees with a cellular phone having WiFi capabilities and a service plan that permits unlimited local calling within a particular area code. The user terminals 100 are equipped with a communications application that can place and receive calls over both the mobile communication network 20 and packet data network 30. Calls placed over the mobile communication network 20 are made according to the applicable standards, such as WCDMA, LTE, and WiMAX. Calls made or received over the packet data network 30 use conventional VoIP protocols. The communication application also allows the user terminals 100 to act as a relay.

User A, while traveling outside of the country, places a call to User C. The communication application on UT-A will attempt to make the call over the network that provides the lowest cost. In general, the packet data network 30 is likely to provide lower costs than the mobile communication network 20 when a user is traveling outside the local calling area. The communication application will recognize that placing the call over the mobile communication network 20 may be prohibitively expensive. Therefore, the communication application will attempt to make the call to User C over the packet data network 30.

The communication application determines whether UT-C is available on the packet data network 30. If so, a connection is made over the packet data network 30 with UT-C using VoIP protocols. If UT-C is not available on the packet data network 30, the communication application searches for another user terminal 100 available on the packet data network 30 that may serve as a relay for communications with UT-C. In this example, UT-A discovers that UT-B is available on the packet data network 30 and is within the local calling area of UT-C. Therefore, the communication application for UT-A establishes a connection with UT-B over the packet data network 30 and sends UT-B a request to relay a call to UT-C. If UT-B accepts, UT-B establishes a second connection with UT-C and serves as a relay for communications between UT-A and UT-C. Company A incurs WiFi connection charges for UT-A. However, long distance charges imposed by the cellular service provider are avoided.

While the use case described above is based on a corporate group, other types of groups could also be formed. For example, users may form groups comprising family and friends. One member of the group may subscribe to a relatively expensive long distance calling plan that allows unlimited long distance calls or a large number of long distance minutes. The group member with the long distance plan can "share" minutes of allowed under the long distance calling plan with other members of the group. For example, assume that user B in FIG. 1 has subscribed to a long distance plan and that user A needs to make a long distance call to user C. In this case, the communication application will recognize that the user A is attempting to make a long distance call and does not have a long distance calling plan. The communication application for UT-A will attempt to make a call to user C over the packet data network 30. If UT-C is not available on the packet data network 30, UT-A will determine whether UT-B is available. If so, UT-A will establish a connection with UT-B and request UT-B to act as a relay for a call between UT-A and UT-C.

Groups of unrelated individuals could also be formed through social networks. For example, users that frequently make international calls may join phone-sharing groups wherein the group members agree to share unused minutes with other group members. The group members may live in different countries. Thus, if a user in the United States needs to place an international call to Sweden, the user terminal 100 for the U.S. user may request a user terminal 100 of another group member living in Sweden to relay the call. Conversely, if the Swedish user needs to place a call to the United States, the user terminal 100 for the Swedish user could request the user terminal 100 for the U.S. user to act as a relay.

A variety of mechanisms could be used to determine the availability of group members. For example, the user terminal 100 could store group A group lists or buddy lists in memory of the user terminal 100. A user may be allowed to join multiple groups. The group list or buddy list could be managed by the communication application. The availability of group members on the packet data network 30 may be determined using the session initiation protocol (SIP) presence notification methods. Briefly, users that have joined groups may subscribe to receive presence updates from other group members. Thus, a user may receive the presence notification from a present server 34 (FIG. 1) or other group member whenever the group member presence status changes. Alternatively, the group list may be stored in a group server 36 on the packet data network. The group server manages groups and maintains group lists. The groups may be public or private. The communication application on the user terminal 100 may retrieve group lists for groups joined by the user when the communication application is started. The group server 36 may be combined with a presence server 34 that provides presence notifications.

The present invention may also facilitate the development of secondary markets in which individual users offer unused minutes to other users for a fee. For example, a user may subscribe to a relatively expensive long distance calling plan that allows more minutes than the user actually needs. The user with a long distance calling plan may offer the unused minutes to other users for a fee. The offering user may publish the requested fee to prospective users through social networks, websites, or even classified advertisements in printed media. If the user terminal 100 is equipped with a Bluetooth interface, the service may be published to other nearby users using well-known Bluetooth publication and discovery procedures. Thus, a variety of mechanisms can be provided to enable users to discover devices in their proximity that are offering unused minutes for sale. When a user lacking a long distance calling plan needs to make a long distance call, the user may search for other users with long distance plans that are willing to share their unused minutes for a fee. The amount of the fee could also be negotiated between the sharing party and the party placing the call. The negotiation could be conducted automatically in cases where the offering party sets rules for acceptable ranges of service terms. The users may set up electronic payment accounts (e.g., Pay Pal) to facilitate payment of the requested fees.

In some embodiments, the user terminals 100 may be equipped with a short-range radio interface, such as a BLUETOOTH interface. In this case, the calling terminal 100 could use the BLUETOOTH interface to connect to a relaying device to gain access to the packet data network 30. Similarly, the calling party may connect with the relaying party through the packet data network 30 as previously described and the relaying user terminal 100 may use a BLUETOOTH interface to establish a connection with the called party.

As a further example, assume that the User A is traveling beyond his/her local calling area and needs to place a call to User C. UT-A does not have access to the packet data network 30, either because UT-A lacks inherent WiFi capability or because access is restricted. However, UT-D (FIG. 1) is located nearby and is willing to provide access to the packet data network to UT-A. UT-A may establish a connection 18 with UT-D using a BLUETOOTH interface in order to access the packet data network 30. UT-D may charge a fee for the service. After gaining access to the packet data network, UT-A may attempt to place a call as previously described to UT-C. More particularly, UT-A will determine whether UT-C is available on the packet data network 30 and, if so, make the call over the packet data network 30. If UT-C is not available on the packet data network 30, UT-A will search for a third party accessible on the packet data network 30 to relay the call. In this example, UT-A discovers that UT-B is available on the packet data network 30 and is within the local calling area of UT-C. Therefore, the communication application for UT-A establishes a connection with UT-B over the packet data network 30 and sends UT-B a request to relay a call to UT-C. If UT-B accepts, UT-B establishes a second connection with UT-C and serves as a relay for communications between UT-A and UT-C. UT-D transparently relays communications between UT-A and UT-B.

The calling party user terminal 100 may also use a BLUETOOTH interface to make a local call when the calling party is traveling outside his/her local calling area. For example, assume that User A is traveling in a foreign country and needs to make a local call in the foreign country. The calling party's user terminal 100 may attempt to place the call using a WiFi and VoIP as previously described to avoid access charges for the foreign mobile network provider. If the called party is not available on the packet data network 30, the user terminal 100 may search for other BLUETOOTH-enabled user terminals 100 within range that are willing to serve as a relay. The idea is to find another party for whom the call is a local call. The BLUETOOTH protocols include search and discovery procedures that are well-known in the art. If another BLUETOOTH-enabled user terminals 100 within range is found that is willing to act as a relay, then the calling party can connect with the relaying terminal via BLUETOOTH and request a relay. In this case, the relaying party may charge a fee for the service of relaying the call.

In each of the scenarios described, the users may define a set of rules that govern the sharing of unused minutes. For example, rules can be set to limit sharing based on the date and/or time of day, the type of call, number of unused minutes available, current battery level, current RSSI signal level, present location, presence/availability status, etc. Also, rules can be defined to enable sharing only for a defined group of users or to prohibit sharing for a defined group of users. For example, the communication application may allow the user to define a "buddy list" including the identities of users for whom the user terminal 100 may act as a relay. The communication application may also allow the user to define a "blacklist" containing the identity of users for whom the user terminal 100 is not allowed to act as a relay.

When a phone call from a calling party to a called party is relayed through the user terminal of a third party, there is a potential problem with the caller ID. It would be desirable to have the caller ID for the calling party displayed to the called party rather than the caller ID of the relaying party. Some mobile communication networks 20 may allow a caller to designate an alternate telephone number to be displayed in place of the caller's default telephone number. For example, U.S. Pat. Publ. No. 2002/0128022 discloses one method of substituting an alternate telephone number for a user's normal telephone number. The alternate telephone number is transmitted to the mobile communication network 20 when the call is placed, along with a request to substitute that alternate number for the default telephone number. The network 20 may then substitute the alternate telephone number for the relaying party's telephone number as the caller ID number.

The technique of substituting an alternate telephone number for a default telephone number can be used in the present invention to display the calling party's number as the caller ID instead of the telephone number of the relaying device. When the call is placed, the user terminal 100 for the calling party provides its telephone number to the user terminal 100 for the relaying party. The user terminal 100 for the relaying party may then request the network 20 to substitute the calling party's telephone number for the relaying party's telephone number as the caller ID using the techniques described in the above-identified patent publication.

In some embodiments of the invention, the communication application on the called party's user terminal 100 may be configured to ignore the caller ID information provided by the mobile communication network 20 and to display the calling party's telephone number as the caller ID. The communication application for the called party's user terminal 100 may be configured to recognize when the incoming call from the relaying party originates with the calling party. In this case, the user terminal 100 for the called party may substitute the calling party's telephone number for the relaying party's telephone number in the caller ID that is displayed to the user.

In other embodiments, the user terminal 100 for the calling party may send a uniform resource locator (URL) to the relaying party. The URL is associated with the calling party's personal page. The relaying party may provide the URL to the called party when the relaying party establishes a connection with the called party. In this case, the communication application on the called party's user terminal 100 may use the URL to access the calling party's personal page to get the caller ID information for display to the called party.

Figure 2:
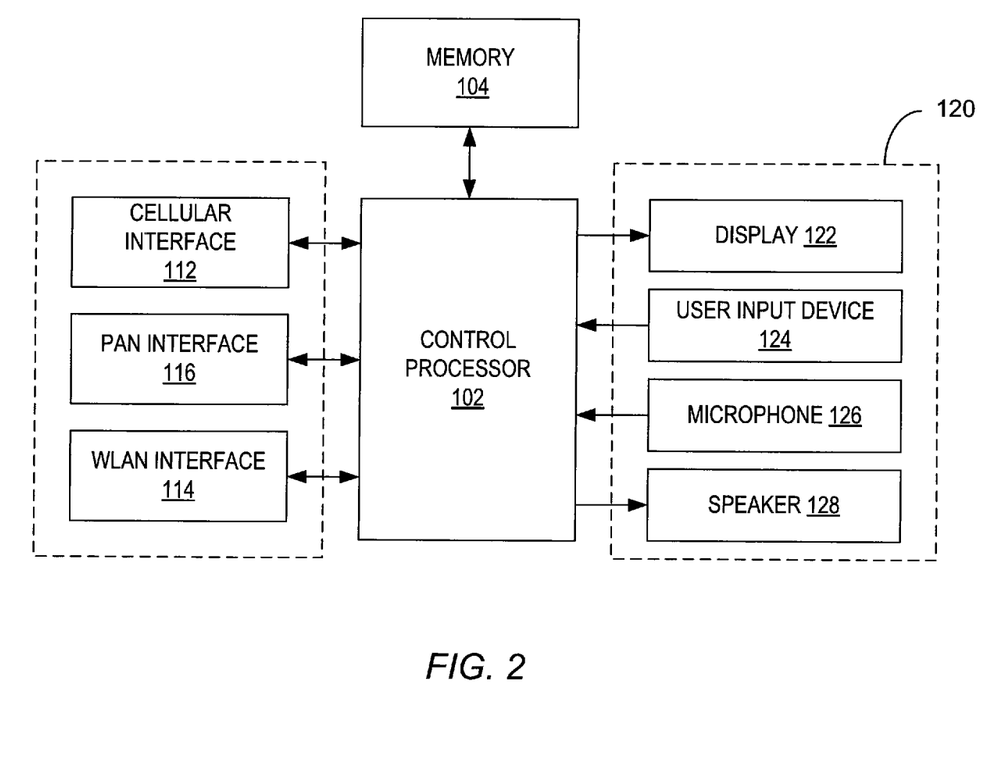
FIG. 2 illustrates an exemplary user terminal.

FIG. 2 illustrates an exemplary user terminal 100 according to the present invention. The user terminal 100 comprises a main control processor 102, memory 104, communication circuit 110, and user interface 120. The main control processor 102 controls overall operation of the user terminal 100 according to program instructions stored in memory 104. The main control processor 102 may comprise one or more microcontrollers, microprocessors, hardware, or a combination thereof. Memory 104 stores programs executed by the main control processor 102 and data needed for operation. Memory 104 may comprise volatile memory such as random access memory, non-volatile memory such as read-only memory, flash memory, etc., or some combination of the two. Programs stored in memory 104 include a communication application executed by the main control processor 102 that performs the communication operations as described herein.

The communications circuit 110 enables the user terminal 100 to communicate with other devices over communication networks. In the exemplary embodiment, the communications circuit 110 includes two separate interfaces referred to herein as the cellular interface 112 and WLAN interface 114. The cellular interface 112 enables the user terminal 100 to communicate with a conventional mobile communication network 20, such as WCDMA, LTE, or WiMAX network. The WLAN interface 114 is an interface for communicating with WAPs 32 on the packet data network 30. An exemplary WLAN interface could operate according to the 802.11 family of standards, which is commonly known as a WiFi interface. In some embodiments, the user terminal 100 may further include a personal area network (PAN) interface 116, such as a BLUETOOTH interface. The PAN interface 116 can be used in the present invention to connect with a relaying terminal as previously described.

The user interface 120 enables the user to interact with and control the user terminal 100. The main components of the user interface include a display 122, one or more user input devices 124, microphone 126, and speaker 128. The main control processor 102 outputs information to the display 122 for viewing by the user and receives user input via the user input devices 124. The user input devices 124 may comprise, for example, keypads and keyboards, input buttons, touch pads, joysticks, track balls, and other such devices for receiving input from a user. The display 122 may comprise a touch-screen display that also functions as a user input device. Microphone 126 converts audible sounds into audio signals for input to the main control processor 102. Speaker 128 converts audio signals output by the main control processor 102 into audible sounds that can be heard by a user. The user terminal 100 may have other additional features not illustrated in FIG. 2.

Figure 3:
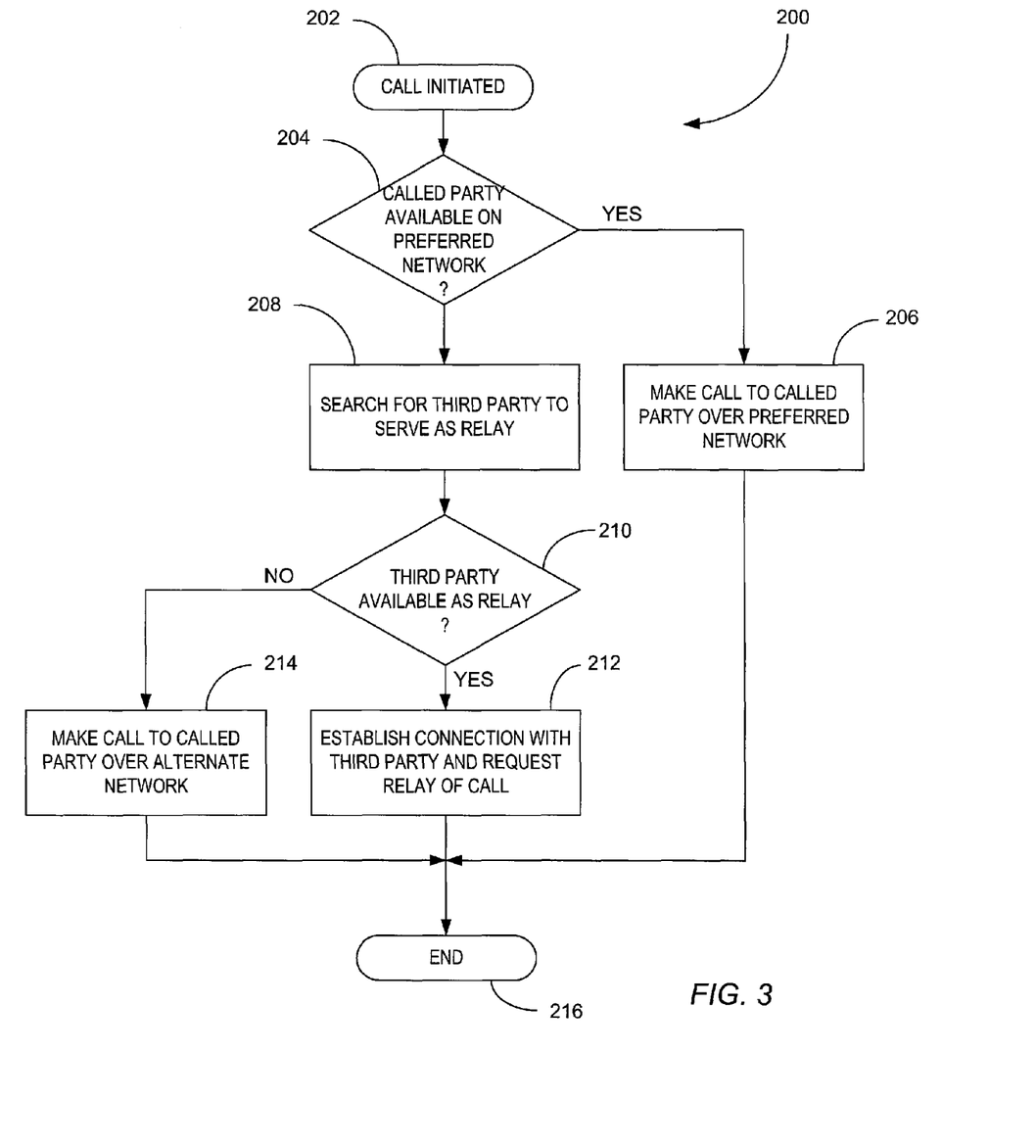
FIG. 3 illustrates an exemplary method implemented by a user terminal for a calling party for establishing a call between a calling party and a called party using a third party as a relay.

FIG. 3 illustrates an exemplary method 200 implemented by a user terminal 100 for the calling party according to one embodiment of the invention. The method 200 begins when the user terminal 100 is outside its local calling area and the user initiates a call, typically by dialing the telephone number of the called party (block 202). For example, the user terminal 100 may be registered with a foreign mobile network. In this case, the user terminal 100 will recognize that long distance charges or access fess will be charged when the user attempts to place a call. Alternatively, if the user terminal 100 is equipped with GPS, the user terminal 100 may determine when it is outside its calling area based on its current geographic location. When a call is initiated from outside the user's calling area, the communication application determines whether the called party is available on a preferred network (block 204). Note that the calling party user terminal 100 may access the packet data network 30 directly or indirectly. In instances where the calling party is attempting to make a long distance call or international call, the preferred network will typically comprise a packet data network 30, such as the Internet. Those skilled in the art will appreciate, however, that the mobile communication network 20 may be preferred in some circumstances. If the called party is available on the preferred network, the call is made to the called party on the preferred network (block 206). If the called party is not available on the preferred network, the communication application searches for a third party available willing to relay the call between the calling party and the called party (block 208). In some embodiments, the user terminal 100 will search for a third party available on the preferred network. In other embodiments, the user terminal 100 may search for a third party available on a personal area network (e.g., BLUETOOTH). If a third party is located (block 210), a call is made to the third party and a request is sent to the third party to relay the call to the called party (block 212). If no third party is identified, the call is made to the called party over the non-preferred network (block 214). The procedure ends when the call is connected or the user ends the process (block 216).

Figure 4:
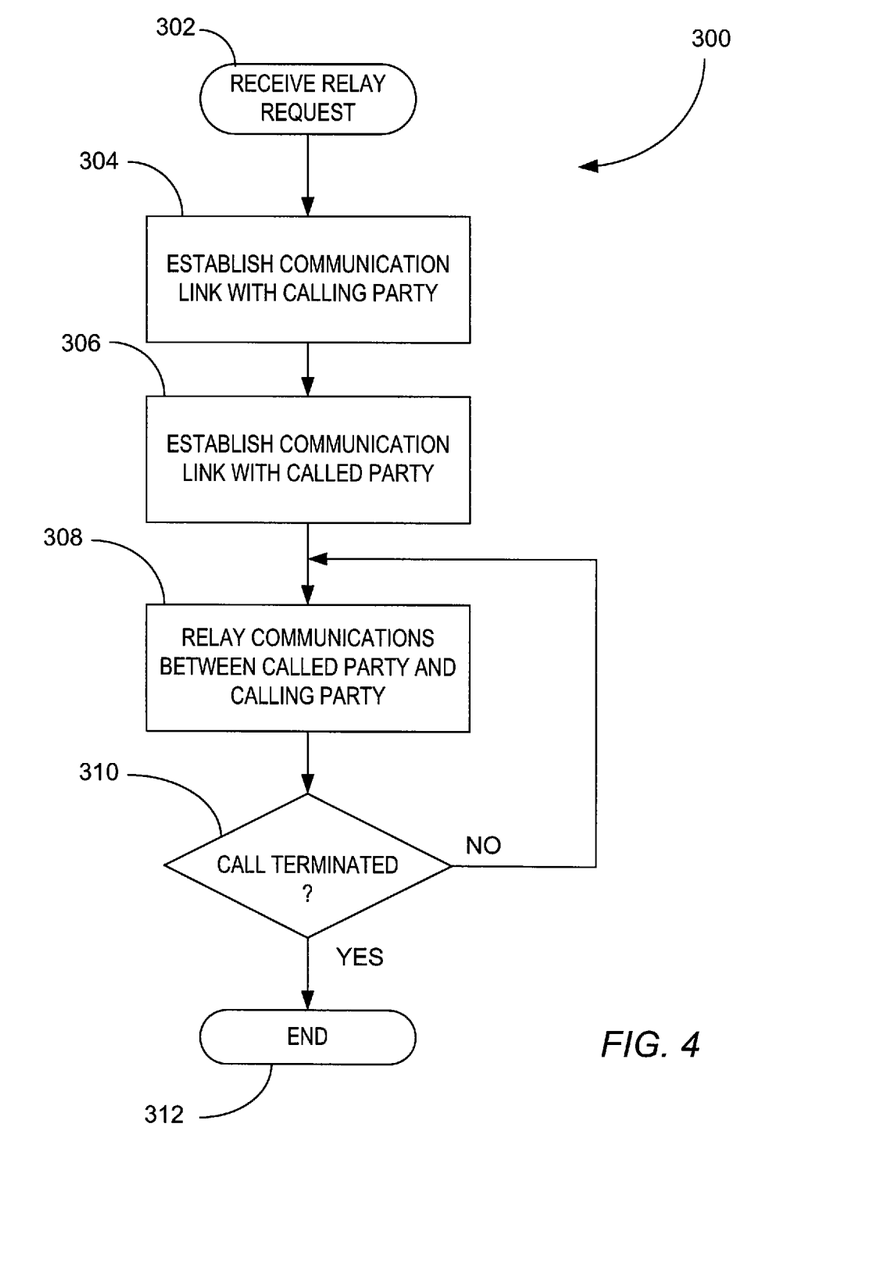
FIG. 4 illustrates an exemplary method implemented by a user terminal for a third party for relaying a call between a calling party and a called party.

FIG. 4 illustrates an exemplary procedure implemented by a user terminal 100 that is acting as a relay. The procedure begins when the communication application in the user terminal 100 for the relaying party receives a request from the user terminal 100 to relay a telephone call to a called party (block 302). The relay request may include the telephone number or other address of the called party. Also, the relay request may include an URL for the calling party's personal page. If the request is accepted, the user terminal 100 for the relaying party establishes a communication link with the user terminal for the calling party (block 304). This communication link will typically be established over the packet data network 30 using VoIP protocols. The user terminal 100 for the relaying party also establishes a second communication link with the user terminal for the called party (block 306). The second link may be established over the mobile communication network 20 in a conventional fashion. After the communication links are established, the user terminal 100 for the relaying party relays communications between the called party and the calling party (block 308). When the call is terminated, the user terminal tears down the communication links and the procedure ends (block 310).

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method implemented by a user terminal for a calling party of placing a call from a calling party to a called party remotely located from the calling party, said method comprising:
    determining the availability of a called party user terminal on a packet data communication network;
    establishing a call with the called party user terminal over the packet data network if the called party user terminal is available on the packet data network; and
    if the called party user terminal is not available on the packet data network, identifying a third party user terminal available to relay the call and requesting the third party user terminal to relay said call from the calling party user terminal to the called party user terminal over an alternate communication network.

2. The method of claim 1 wherein identifying a third party user terminal available to relay the call comprises identifying a third party terminal available on the packet data network to relay the call.

3. The method of claim 2 wherein identifying a third party user terminal available on the packet data network comprises accessing a group list for a predefined group, and identifying one or more third party user terminals on said group list that are currently available on said packet data network.

4. The method of claim 3 wherein determining the availability of the called party user terminal on a packet data communication network comprises periodically receiving presence information from a presence server indicating the availability status of said called party user terminal.

5. The method of claim 3 wherein said group list is stored in said calling party user equipment.

6. The method of claim 3 wherein said group list is stored in a server accessible via said packet data network.

7. The method of claim 1 wherein identifying a third party user terminal available to relay the call comprises identifying a third party terminal available on a personal area network to relay the call.

8. The method of claim 1 wherein requesting the third party user equipment to relay said call from said calling party to a user terminal of said called party comprises:
    establishing communication with said third party user terminal;
    providing a called party address to said third party user terminal for establishing communication between said third party user equipment and said called party user terminal over an alternate communication network.

9. A dual mode user terminal comprising:
    a first communication interface for communicating over a mobile communication network;

a second communication interface for communicating over a packet data network;

a control processor configured to:
: determine the availability of a called party user terminal on the packet data network;
: establish a call with the called party user terminal over the packet data network if the called party user terminal is available on the packet data network; and
: if the called party user terminal is not available on the packet data network, identify a third party user terminal available to relay the call and request the third party user terminal to relay said call from the calling party user terminal to the called party user terminal over the mobile communication network.

10. The dual mode user terminal of claim 9 wherein the control processor is configured to identify a third party user terminal available on the packet data network to relay the call.

11. The dual mode user terminal of claim 10 wherein the control processor is configured to identify a third party user terminal available on the packet data network by accessing a group list for a predefined group, and identifying one or more third party user terminals on said group list that are currently available on said packet data network.

12. The dual mode user terminal of claim 11 wherein the control processor is configured to determine the availability of the called party user terminal on a packet data communication network by periodically receiving presence information from a presence server indicating the availability status of said called party user terminal.

13. The dual mode user terminal of claim 11 wherein said group list is stored in said calling party user equipment.

14. The dual mode user terminal of claim 11 wherein said group list is stored in a server accessible via said packet data network.

15. The dual mode user terminal of claim 9 wherein the control processor is configured to identify a third party user terminal available on a personal area network to relay the call.

16. The dual mode user terminal of claim 9 wherein the control processor is configured to request the third party user equipment to relay said call from said calling party to a user terminal of said called party by:
: establishing communication with said third party user terminal;
: providing a called party address to said third party user terminal for establishing communication between said third party user equipment and said called party user terminal over an alternate communication network.

\* \* \* \* \*